US007996452B1

(12) United States Patent
Cruz-Albrecht et al.

(10) Patent No.: US 7,996,452 B1
(45) Date of Patent: Aug. 9, 2011

(54) PULSE DOMAIN HADAMARD GATES

(75) Inventors: Jose Cruz-Albrecht, Oak Park, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1141 days.

(21) Appl. No.: 11/595,107

(22) Filed: Nov. 10, 2006

(51) Int. Cl.
*G06F 17/14* (2006.01)
*G06G 7/12* (2006.01)

(52) U.S. Cl. ........................................ 708/400; 708/820

(58) Field of Classification Search .................. 708/410, 708/400, 820
See application file for complete search history.

(56) References Cited

U.S. PATENT DOCUMENTS

| | | | | |
|---|---|---|---|---|
| 4,383,248 | A | 5/1983 | Smith | 340/999.999 |
| 4,939,515 | A * | 7/1990 | Adelson | 341/51 |
| 5,185,715 | A | 2/1993 | Zikan | 364/807 |
| 5,345,398 | A | 9/1994 | Lippmann et al. | 702/53 |
| 5,479,170 | A | 12/1995 | Cauwenberghs et al. | 341/200 |
| 5,566,099 | A | 10/1996 | Shimada | 364/717 |
| 5,894,280 | A | 4/1999 | Ginetti et al. | 341/118 |
| 6,172,536 | B1 | 1/2001 | Yoshihara | 327/87 |
| 6,452,524 | B1 | 9/2002 | Fraleigh et al. | 341/143 |
| 6,473,019 | B1 | 10/2002 | Ruha et al. | 341/143 |
| 6,975,682 | B2 | 12/2005 | Cosand | 375/247 |
| 7,038,608 | B1 | 5/2006 | Gilbert | 341/144 |
| 7,253,761 | B1 | 8/2007 | Hoyos | 341/155 |
| 7,324,035 | B2 | 1/2008 | Harris | 341/155 |
| 7,403,144 | B1 * | 7/2008 | Cruz-Albrecht et al. | 341/143 |
| 7,405,686 | B2 | 7/2008 | Laroia et al. | 341/143 |
| 7,573,956 | B2 | 8/2009 | Lazar | 375/340 |
| 2006/0087467 | A1 | 4/2006 | Itskovich | 341/155 |
| 2007/0069928 | A1 | 3/2007 | Gehring | 445/115.1 |

OTHER PUBLICATIONS

Author: Xia et al.; Title: "A Recurrent Neural Network for Solving Nonlinear Convex Programs Subject to Linear Constraints"; Date: Mar. 2005; Cited on IDS: May 11, 2009.*
Author: Wikipedia; Title: Van der Pol oscillator; Date: Jun. 18, 2010; URL: http://en.wikipedia.org/wiki/Van_der_Pol_oscillator.*
Author: Wikipedia; Title: "Relaxation oscillator"; Date: Jun. 18, 2010; URL: http://en.wikipedia.org/wiki/Relaxation_oscillator.*
J. Keane and L Atlas, "Impulses and stochastic arithmetic for signal processing," Proc. 2001 IEEE International Conference on Acoustics, Speech, and Signal Processing, pp. 1257-1260, 2001.
Lazar, A., et al., "Perfect Recovery and sensitive analysis of time encoded bandlimited signals," IEEE Transactions on Circuits and Systems-1 Regular Papers, vol. 51, No. 10, Oct. 2004.
U.S. Appl. No. 11/726,484, Cruz-Albrecht, Jose, et al., filed Mar. 22, 2007.
U.S. Appl. No. 60/984,354, Cruz-Albrecht, Jose, filed Oct. 31, 2007.
U.S. Appl. No. 60/984,357, Petre, Peter, filed Oct. 31, 2007.
Cruz, J.M., et al, "A 16 x 16 Cellular Neural Network Universal Chip: The First Complete Single-Chip Dynamic Computer Array with Distributed Memory and with Gray Scale Input-Output," Analog Integrated Circuits and Signal Processing, 15, pp. 227-237, 1998.
Dighe, A.M., et al., "An Asynchronous Serial Flash Converter", 9th Int. Conf. on Electronics, Circuits and Systems, IEEE, pp. 13-15, 2002.

(Continued)

*Primary Examiner* — Tan V Mai
(74) *Attorney, Agent, or Firm* — Ladas & Parry

(57) ABSTRACT

A hadamard gate includes two strongly cross-coupled limit cycle oscillators. Each limit cycle oscillator includes an amplifier, a summing node, an integrator, a hysteresis quantizer, a self-feedback 1-bit DAC (Digital-to-Analog Converter) and a cross-feedback 1 bit DAC. Each oscillator output drives its own self-feedback DAC and the cross-feedback DAC of the other oscillator.

10 Claims, 8 Drawing Sheets

OTHER PUBLICATIONS

D. Donoho, "Compressed Sensing," IEEE Transactions on Information Theory, vol. 42, No. 4, pp. 1289-1306, Apr. 2006.

Iwamoto, M., et al., "Bandpass Delta-Sigma Class-S Amplifier," Electronic Letters, vol. 36, No. 12, pp. 1010-1012, Jun. 2000.

Roza, E., "Analog to Digital Conversion via Duty Cycle Modulation," IEEE Trans. on Circuits and Systems-II, vol. 44, No. 11, pp. 907-914, Nov. 1997.

Walden, R., "Analog to Digital Converter Survey and Analysis," IEEE Journal on Selected Areas in Communication, vol. 17, No. 4, pp. 539-550, Apr. 1999.

Y. Xia and J. Wang, "A Recurrent Neural Network for Solving Nonlinear Convex Programs Subject to Linear Constraints," IEEE Trans. on Neural Networks, vol. 16, No. 2, Mar. 2005.

Hasler et al ("VLSI Neural Systems and Circuits" 1990 IEEE), pp. 31-37.

Wang et al ("Review of pulse-coupled neural networks" 2009), pp. 5-13.

Laurent Perrinet ("Emergence of filters from natural scenes in a sparse spike coding scheme" 2004), pp. 821-826.

* cited by examiner

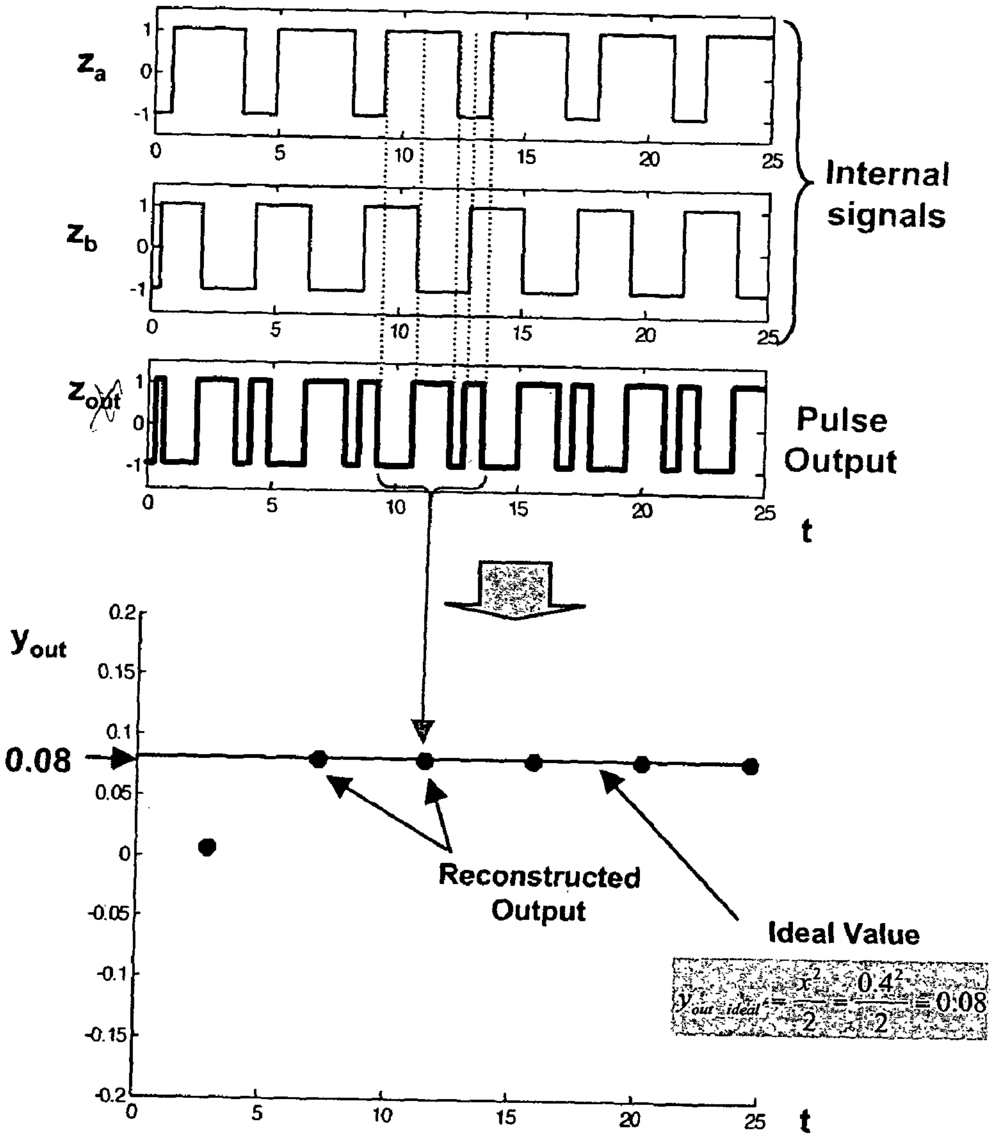
Figure 7b - Results of computer simulation

PULSE DOMAIN HADAMARD GATES

TECHNICAL FIELD

This invention relates to a circuit that takes two analog inputs and produces two pulse outputs that encode a "Hadamard" operation. One pulse output encodes the average of the two analog inputs. The other pulse output encodes one half of the difference of the two analog inputs.

BACKGROUND OF THE INVENTION

In the prior art, arithmetic operations on analog input signals are typically performed either in the (1) original analog domain or in the (2) digital domain after an ADC conversion. In the analog domain the disadvantage is that accuracy is limited by dynamic range of the analog adding components such as analog adders. In the digital domain the disadvantage is that speed is limited by the performance of ADC conversion. Previous work on arithmetic operations on pulse type signals have been limited to methods based on stochastic logic. See J. Keane and L. Atlas, "Impulses and Stochastic Arithmetic for Signal Processing," 2001. Methods based on stochastic logic are also limited in accuracy and in convergence speeds.

The circuit of the invention avoids the accuracy limitation of the analog computing, the speed limitation of the ADC conversion, and the speed and accuracy limitations of pulse stochastic logic. Assuming ideal elements the new circuit converges to the exact solution. The circuit is very compact and fast. The key circuit components are simple, intrinsically-linear, 1-bit digital to analog converters.

FIG. 1 shows a diagram of a prior art time encoder. This circuit has a single analog input and a single pulse output. This circuit encodes analog input signals into pulse domain signals. If the analog signal is bandlimited the encoding can be without loss of information. That is, the input u(t) can be recovered from the timing of the output signal z(t).

Preferred embodiments of the invention utilize Individual Time Encoder Circuits, which are known, per se, in the prior art and have been used before to time-encode a single analog signal input into a signal pulse output with no attempt to perform another function such as arithmetic operations. See A. Lazar and L Toth, "Perfect Recovery and Sensitivity Analysis of Time Encoded Bandlimited Signals," IEEE Trans. on Circuits and Systems—I, vol. 51, no. 10, pp. 2060-2073, October 2004.

BRIEF DESCRIPTION OF THE INVENTION

In one aspect, the hadamard gate of the invention includes two strongly cross-coupled limit cycle oscillators. Each limit cycle oscillator includes an amplifier, a summing node, an integrator, a hysteresis quantizer, a self-feedback 1-bit DAC (Digital-to-Analog Converter) and a cross-feedback 1 bit DAC. Each oscillator output drives its own self-feedback DAC and the cross-feedback DAC of the other oscillator.

The hadamard gate of the invention takes two inputs and performs arithmetic operations on the inputs with the solutions being time-encoded. The arithmetic operations and time encoding is performed simultaneously. The only signals coupling one oscillator with the other oscillator are pulse signals with only two amplitude, values, the information being encoded in the timing of the signals. Assuming ideal elements the circuit pulse outputs converges to the exact desired solution with no quantization error.

The disclosed hadamard gate allows performing fast and accurate arithmetic operations in the pulse domain. It can be applied for real-time processing of input analog signals, such as signals from RF or hyperspectral sensors.

Several embodiments of circuits utilizing Hadamard gates are disclosed. These circuits include a Pulse Domain Square Gate and a Pulse Domain Multiplication Gate.

BRIEF DESCRIPTION OF THE FIGURES

FIGS. 4*a* and 4*b* depict the circuit diagram of a Hadamard gate (see FIG. 4*a*), this gate is also shown in FIG. 2*a*, but this time the Hadamard gate is shown with possible input values (used for a computer simulation), while FIG. 4*b* shows graphs of the pulse trains generated by these exemplary inputs together with reconstructed output values.

FIGS. 7*a* and 7*b* depict the circuit diagram of a Pulse Domain Square Gate (see FIG. 7*a*), this gate is also shown in FIG. 6*b*, but this time the Hadamard gate is shown with an exemplary input value and the pulse trains generated thereby in the upper graph of FIG. 7*b* and reconstructed output values in the lower graph of FIG. 7*b*.

DETAILED DESCRIPTION OF THE HADAMARD GATE

Figure 2A:
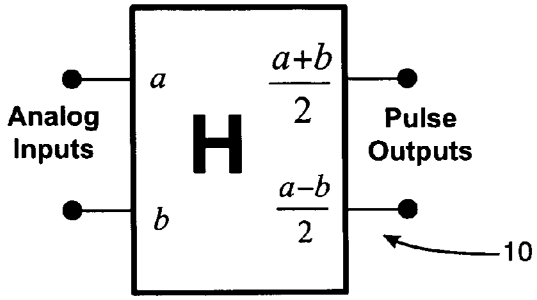
FIG. 2*a* is a simplified diagram of a symbol of the pulse Hadamard gate of the present invention.

FIG. 2*a* is a simplified diagram of a symbol of the pulse Hadamard gate 10 of the present invention. The circuit takes two analog inputs a and b and produces two pulse outputs. The first pulse output encodes (a+b)/2. The second pulse output encodes (a−b)/2. This is the first circuit to be described in this disclosure.

Figure 2B:
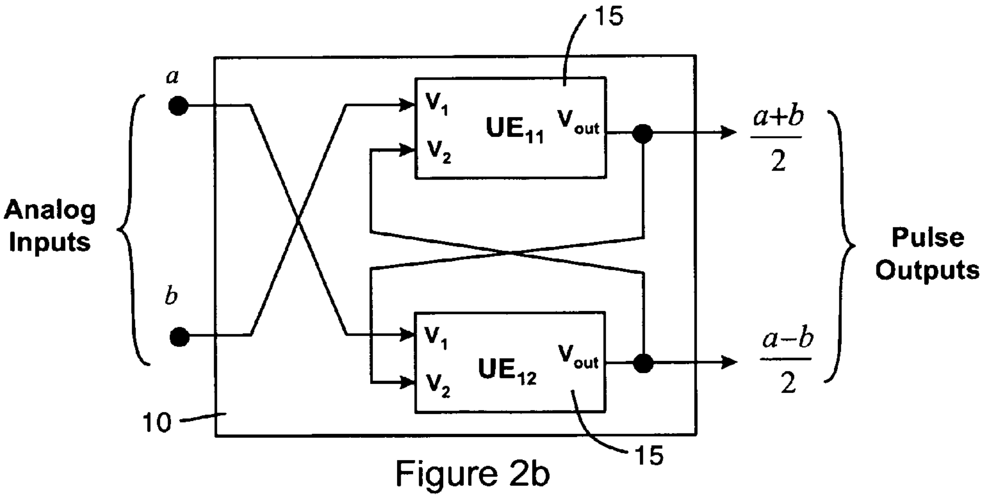
FIG. 2*b* shows the internal components of the pulse Hadamard gate of FIG. 2*a*.
Figure 2C:
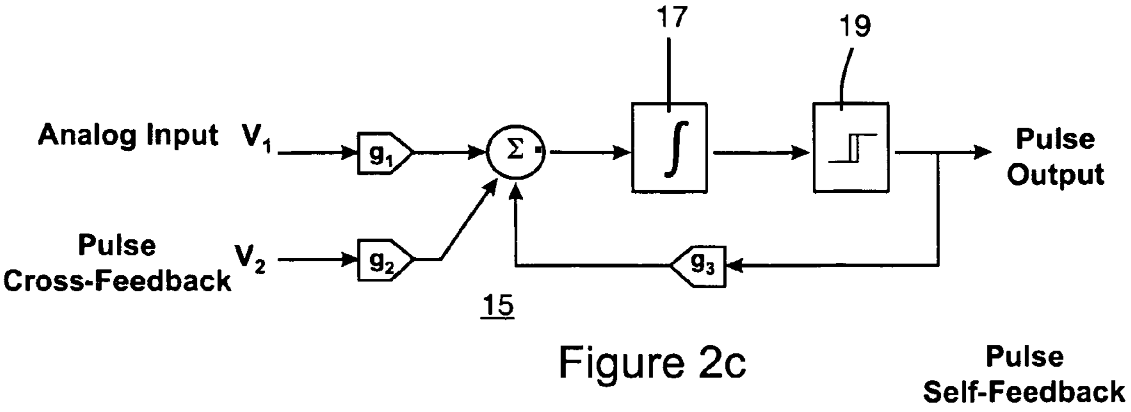
FIG. 2*c* shows the circuit details of a preferred embodiment of each Unit Element/limit cycle oscillator depicted in FIG. 2*b*.

FIG. 2*b* shows preferred internal components of the pulse Hadamard gate. It preferably comprises two circuits denoted as Unit Elements UE11 and UE12. Each unit element is preferably embodied as a limit cycle oscillator 15 as shown in FIG. 2*c*. Each oscillator 15 takes two inputs V1 and V2. The First input, V1, is an analog input. The second input, V2, is a pulse input. Each unit element or oscillator 15 produces a single pulse domain output. Note that the only coupling between the two oscillators 15 in FIG. 2*b* is via the pulse input, V2, of each oscillator 15. That is, only pulse-type signals (not analog signals) are used to couple the two oscillators 15.

FIG. 2*c* shows the circuit details of a preferred embodiment of each Unit Element or limit cycle oscillator 15. The preferred embodiment includes a transconductance amplifier, g1, a summing node Σ, an integrator 17, hysteresis quantizer 19, and two 1 bit Digital-to-Analog converters (DACs) g2 and g3. The 1 bit DACs are asynchronous. They take a logical input voltage with two possible levels and produce a scaled output current with two possible levels. These 1 bit DAC elements are simple, compact and accurate when implemented in VLSI. As they operate with only two input levels and two output levels, they are inherently linear. Since the DACs are asynchronous they need no clock signal. The disclosed Hadamard Gate self-oscillates. The frequency of self-oscillation depends mainly on internal circuit parameters and weakly on the input signals.

In FIG. 2*c*, the preferred normalized circuit parameters of $UE_{11}$ and $UE_{12}$ are as follows:

| $UE_{11}$ | $UE_{12}$ |
|---|---|
| $g_1 = 1$ | $g_1 = 1$ |
| $g_2 = 1$ | $g_2 = -1$ |
| $g_3 = -1$ | $g_3 = -1$ |
| $V_{OH} = 1$ | $V_{OH} = 1$ |
| $V_{OL} = -1$ | $V_{OL} = -1$ |

These parameters result in a self-oscillating frequency of approximately 0.25 Hz.

The first parameter value ($g_1$) denotes the linear gain of the input transconductance amplifiers. The next two parameter values ($g_2$, $g_3$) represent the gain of the two 1 bit DACs. The next two values are the positive and negative voltage levels $V_{TH+}$ and $V_{TH-}$ at the output of the hysteresis quantizer 19. The parameters for both Unit Elements $UE_{11}$ and $UE_{12}$ 15 are identical, except for the gain of DAC used to scale the pulse-cross feedback signal between the two oscillators. This DAC gain has an opposite sign in the case of each Unit Element $UE_{11}$ and $UE_{12}$.

Figure 3:
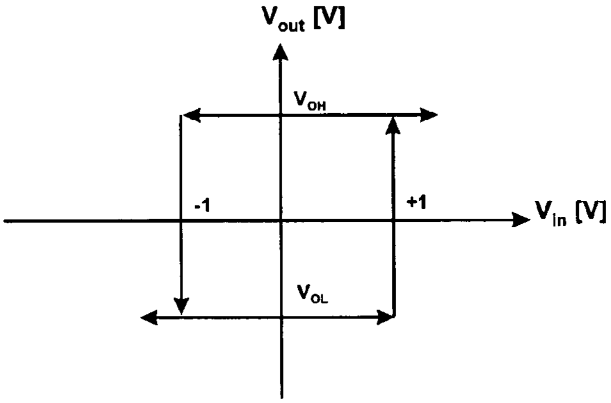
FIG. 3 is a graph of the output-input characteristics of a hysteresis quantizer.

FIG. 3 shows a graph of the Output-Input characteristic of the hysteresis quantizer 19 used in the unit elements 15. There are only two possible output levels, $V_{OH}$ and $V_{OL}$, shown in the vertical axis of the graph of FIG. 3. In the embodiment described above these output voltages are preferably set to +1V and −1V. The transition between the two output levels occur at two different input trigger voltage levels. In this embodiment these trigger voltage levels are preferably normalized to −1V and +1V and are shown in the horizontal axis of the graph of FIG. 3. All these values can be scaled, as best suited for a particular VLSI implementation and the processing used to make an IC, without changing the basic operation of the disclosed Hadamard Gate circuit. Those skilled in the art will appreciate that an IC implementation would be preferred over a circuit made using discrete components.

Figure 4A:
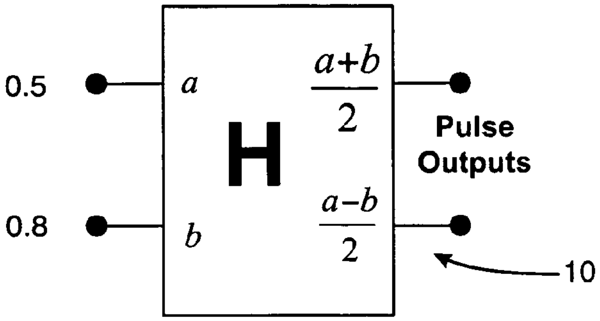
Figure 4B:
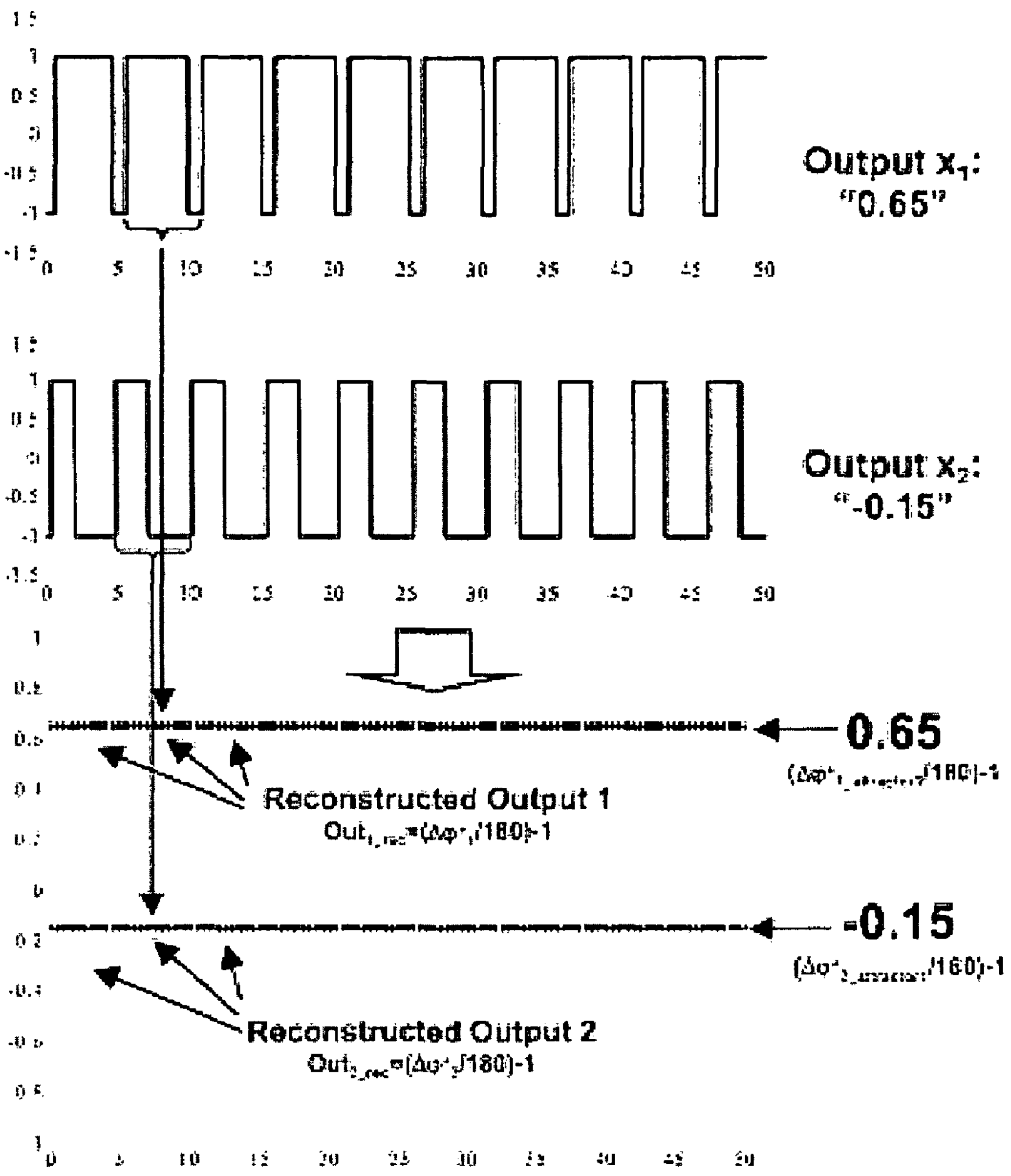

FIG. 4*b* shows waveforms corresponding to an exemplary embodiment demonstrating of operation of the Hadamard circuit 10 described above. In this exemplary embodiment the inputs are two constant analog voltages which are set to a=+0.5V and b=+0.8V for the purposes of this example, which inputs are shown adjacent the hadamard gate 10 (see FIG. 4*a*).

The top two graphs of FIG. 4*b* show the two pulse outputs of the pulse Hadamard gate 10. In each of these two graphs the horizontal axis is time in seconds. The vertical axis is the output voltage. It can be observed that the output voltage take only two possible values that are fixed to +1V and −1V in this embodiment. The information is encoded in the timing of the pulse transitions.

The bottom graph of FIG. 4*b* shows a reconstruction back to analog of the time encoded output data. This reconstruction is done to evaluate the performance of the Hadamard gate 10 in doing the two desired time-encoded arithmetic operations.

The very top graph of FIG. 4*b* provides the first Hadamard arithmetic computation with the solution $x_1$ being time encoded. The first Hadamard arithmetic computation consists of calculating the average of the two inputs, namely (a+b)/2. The time encoding projects the solution into the timing. The output is composed of pulse cycles. Each pulse cycle is defined between the rise transitions of two consecutive positive pulses. In the phase space each individual cycle is composed of two phase intervals: (1) the phase interval $\Delta\phi_1^+$ (in degrees) where the pulse level is positive and (2) the phase interval, $360°-\Delta\phi_1^+$, during which the pulse level is negative. In the Hadamard gate the encoded value, y1, and the phase interval $\Delta\phi_1^+$ are related by the following formula:

$$y1=\Delta\phi_1^+/180-1 \quad \text{(Equation 1)}$$

In ideal operation the expected encoded value, y1, of the first output should be equal to first Hadamard computation, namely (a+b)/2, or 0.65 for this example. The third graph of FIG. 4(*b*) provides a reconstruction of the first pulse output for each cycle using Equation 1. In computer simulations of the circuit the initial condition in the two integrators of the Hadamard gate were set to a random value. The circles correspond to the reconstruction of the encoded value. They converge to the desired solution, which, in this case, is 0.65.

The second graph of FIG. 4*b* provides the second Hadamard arithmetic computation with the solution being time encoded. The second Hadamard arithmetic computation consists of calculating the half of the difference of the two inputs, namely (a−b)/2. The time encoding projects the solution into the timing. For each cycle $\Delta\phi_2^+$ corresponds to the phase interval where the pulse level is positive. The encoded value, y2, and the phase interval $\Delta\phi_2^+$ are related by the following formula:

$$y2=\Delta\phi_2^+/180-1 \quad \text{(Equation 2)}$$

In ideal operation the expected encoded value, y2, of the second output should be equal to second Hadamard computation, namely (a−b)/2, or −0.15 for this particular example. The fourth graph of FIG. 4*b* provides a reconstruction of the first pulse output for each cycle using Equation 2. The circles correspond to the reconstruction of the encoded value. They converge to the desired solution for this example, which, in this case, is −0.15.

A summary of operation of the circuit afore-described follows. The encoded data at the circuit outputs always converge to the ideal target solution.

For each output pulse period:

Output x1 is high during $\Delta\phi_1^+$ degrees and low during $(360-\Delta\phi_1^+)$ degrees.

Output x2 is high during $\Delta\phi_2^+$ degrees and low during $(360-\Delta\phi_2^+)$ degrees.

Circuit has 1 stable phase attractor. Attractor depends on inputs a and b, according to:

$$\Delta\phi_{1\_attractor1}^+=((a+b)/2+1)180 \text{ degrees(exact)}$$

$$\Delta\phi_{2\_attractor1}^+=((a-b)/2+1)180 \text{ degrees(exact)}$$

Outputs always (for any input & initial condition) are attracted to the unique stable phase attractor $$\Delta\phi_1^{+} \rightarrow \Delta\phi_{1\_attractor1}^{+}$$

$$\Delta\phi_2^{+} \rightarrow \Delta\phi_{2\_attractor1}^{+}$$

Figure 5:
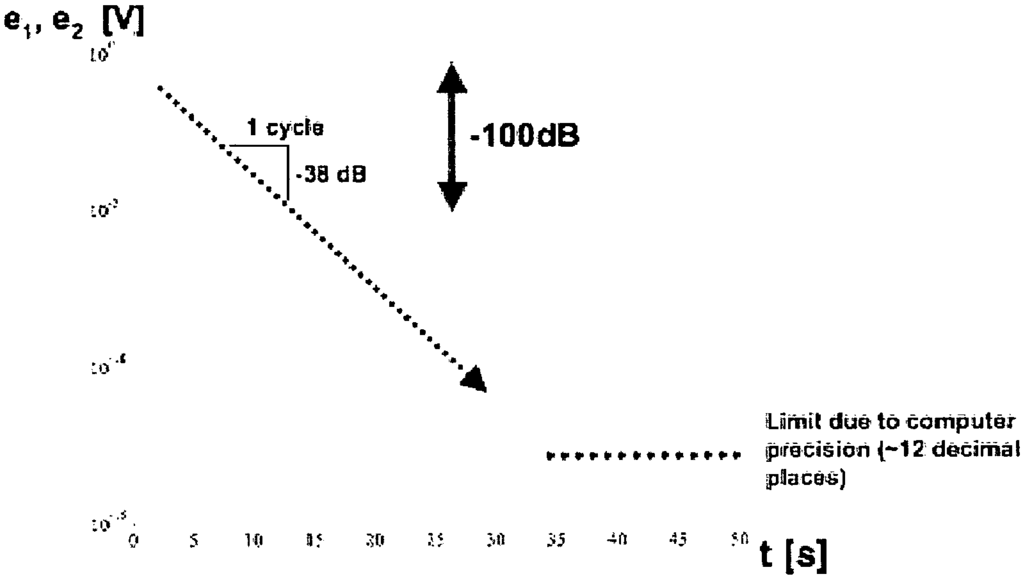
FIG. 5 shows the error-time evolution plot for the gate of FIGS. 2*a* and 4*a*.

The convergence to the ideal target solution is exponentially fast. FIG. 5 shows the evolution of the errors, e1 and e2 over time, when the Hadamard gate is initialized with a random initial condition. These errors are defined according to the following equations:

$$e1 = y1 - y1_{\_ideal} \quad \text{(Equation 3a)}$$

$$e2 = y2 - y2_{\_ideal} \quad \text{(Equation 3b)}$$

where y1 and y2 correspond to the reconstructed data from the two actual pulse waveforms, and y1_ideal and y2_ideal correspond to the ideal solution. It can be observed that the errors decay exponentially over time, which corresponds to a straight line in the plot of FIG. 5, where the vertical axis is in a logarithmic scale. Furthermore the rate of decay is extremely fast. For the example shown the decay is −38 dB/cycle.

A Pulse Domain Square Gate

The Hadamard Gate 10 described above can be used in a number of interesting ways beyond the example described above. It is used in the implementation of the second circuit of this disclosure, namely, a pulse domain square gate 20.

Figure 6A:
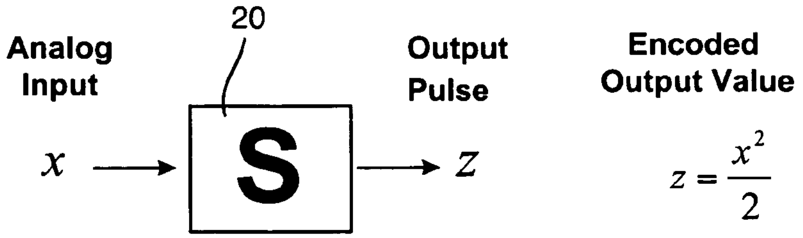
FIG. 6*a* is a simplified diagram of a symbol of the Pulse Domain Square Gate embodiment of the present invention.
Figure 6B:
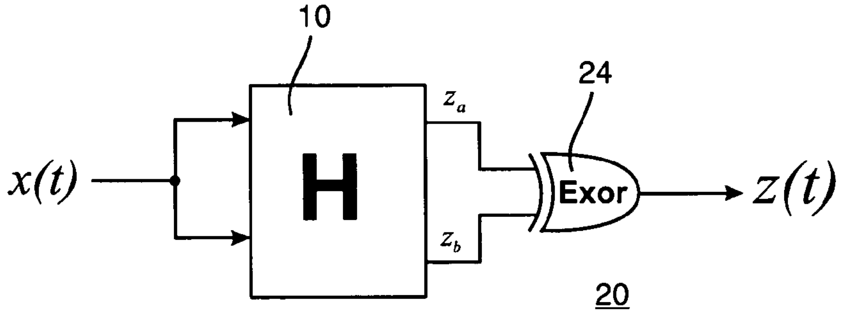
FIG. 6*b* shows the internal components of the Pulse Domain Square Gate of FIG. 6*a*, which utilizes a Hadamard gate of the type shown in FIG. 2*b*.

FIG. 6*a* shows a symbol of a Pulse Domain Square Gate 20. The Pulse Domain Square Gate 20 takes one analog input x and produces one pulse domain output z. The pulse domain output z encodes as one-half of the square of the input x, so $z=x^2/2$. FIG. 6*b* shows the preferred circuit structure of the Pulse Domain Square Gate 20. It includes a Pulse Domain Hadamard gate 10 and an asynchronous EXOR gate 24. The input signal, x(t), is an analog signal. The signals that the intermediate nodes, $z_a(t)$ and $z_b(t)$, are pulsed signals, each with only two possible amplitude levels. The these levels are preferably +1V and −1V, in the present embodiment, but these values can be selected as needed to suit any design criteria. These pulse signals encode analog information in the time domain. The EXOR gate 24 produces (i) a positive output (+1V in the preferred embodiment) when both internal inputs ($z_a(t)$ and $z_b(t)$) have different amplitude levels and (ii) a negative output (−1V in the preferred embodiment) when the internal inputs ($z_a(t)$ and $z_b(t)$) have same amplitude levels.

FIG. 7*b* depicts graphs showing a computer simulation of the pulse domain square circuit 20 with an exemplary input value. In this example the input is a constant analog voltage.

Figure 7A:
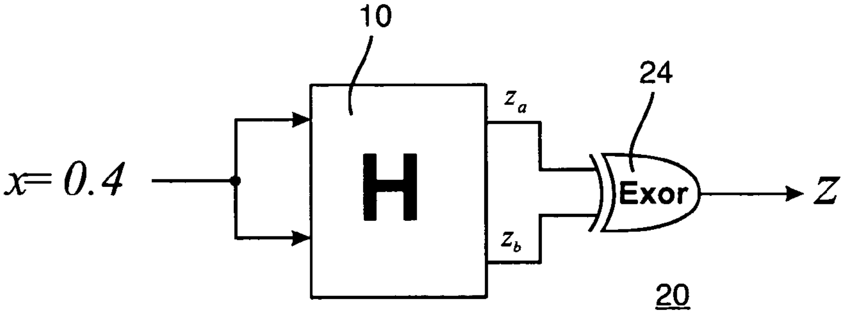

FIG. 7*a* shows the pulse domain square gate setup with its analog input voltage being set to x=+0.4V for the purpose of this example.

The three graphs in upper portion of FIG. 7*b* show the simulated waveforms at the two internal nodes, $z_a$ and $z_b$, and at the output, z, of the EXOR gate 24. The signals at these three nodes are time encoded. The output voltages take only two possible values, +1V or −1V, in the preferred embodiment. The information is encoded in the timing of the pulse transitions. These three waveforms are composed of pulse cycles. Even though the pulse signals are asynchronous (not aligned to a common clock), the three of them are self-synchronized to each other. We can define a common cycle for the three signals as the time interval between the rise transitions of two consecutive positive pulses of the first signal $z_a(t)$.

During each cycle the signals $z_a$ and $z_b$ have one positive pulse, while z has two positive pulses. The signal $z_a$ time encodes a value proportional to the input signal x. For each cycle, the proportion of time that the signal $z_a(t)$ is at the positive amplitude levels directly depends on the value of analog input x. The signal $z_b$ is a 50% duty cycle signal. The phase difference between these two self-synchronized pulse signals, $z_a$ and $z_b$, is dependent on x. For each cycle we define the following quantities:

$\Delta t_1^{++}$=Time interval during which $z_a(t)=+1$ and $z_b(t)=+1$ (Definition 1a)

$\Delta t_1^{+-}$=Time interval during which $z_a(t)=+1$ and $z_b(t)=-1$ (Definition 1b)

$\Delta t_1^{--}$=Time interval during which $z_a(t)=-1$ and $z_b(t)=-1$ (Definition 1c)

$\Delta t_1^{-+}$=Time interval during which $z_a(t)=-1$ and $z_b(t)=+1$ (Definition 1d)

The signal z(t) encodes a value y which ideally corresponds to the square operation $x^2/2$. The reconstruction equation to retrieve this encoded data using the quantities of Definition 1 is:

$$a_k = \frac{\Delta t_k^{+-} + \Delta t_k^{-+} - \Delta t_k^{++}\Delta t_k^{--}}{\Delta t_k^{+-} + \Delta t_k^{-+} + \Delta t_k^{++} + \Delta t_k^{--}}$$

For this example, using x=0.4, the expected encoded value should be $(0.4)^2/2$, which corresponds to 0.08. The last graph of FIG. 7*b* provides a reconstruction of the first pulse output signal z(t) back to analog. This reconstruction is done to evaluate the performance of the gate in doing the desired time-encoded square operation. The reconstruction equation is used once for each signal cycle. During the simulations the initial conditions of the circuitry is set to a random value. The circles correspond to the reconstruction of the encoded value. The encoded value always converges to the ideal target solution. In this particular example the target solution is 0.08.

Figure 8:
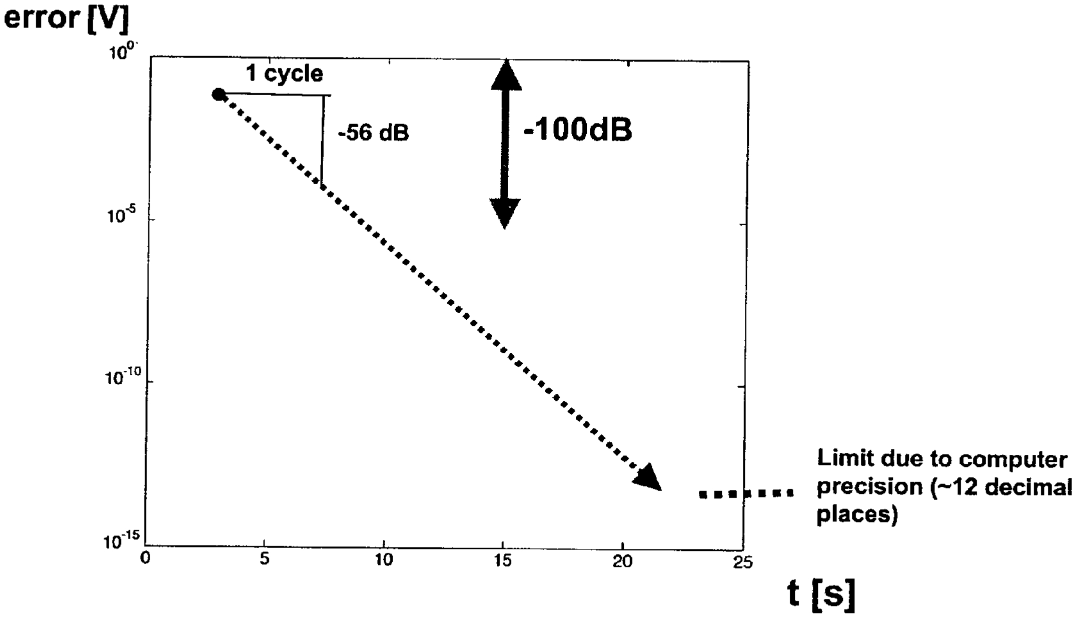
FIG. 8 shows the error-time evolution plot for the gate of FIGS. 6*b* and 7*a*.

The convergence to the ideal target solution is exponentially fast. FIG. 8 shows the evolution of the error over time, when the circuit is initialized with a random initial condition.

These errors are defined according to the following equation:

$$\text{error} = y - y_{ideal} \quad \text{(Equation 4)}$$

where y corresponds to the reconstructed data from the actual pulse waveform, and $y_{ideal}$ corresponds to the ideal solution. It can be observed that the errors decay exponentially over time, which corresponds to a straight line in the plot of FIG. 8, where the vertical axis is in logarithmic scale. Furthermore the rate of decay is extremely fast. For the example shown the decay is −56 dB/cycle.

The square gate 20 is suited for operation with fast changing analog inputs. When the analog inputs applied to the Hadamard gate 10 have a sharp transition, like a very large voltage step (a worst case scenario) the outputs converge to the ideal solution with about 80 dB accuracy in just two cycles, with a 56 dB improvement in each subsequent cycle. For other types of inputs without sharp transitions, like band-limited inputs, very high accuracy, of about 80 dB is achieved in every cycle. Typically there is no need to do averaging over several cycles. In the examples shown before, using normalized unitary values for all circuit components, the cycle time has a normalized value of about 4 s. These normalized values are scaled according to the technology. As an example, using a fast current IC technology in InP, the cycle time is lower than 100 ps. In this technology the square gate 20 can do accurate arithmetic operations and time encoding of analog signals with bandwidths of close to 10 GHz.

A Pulse Domain Product Gate

Figure 9A:
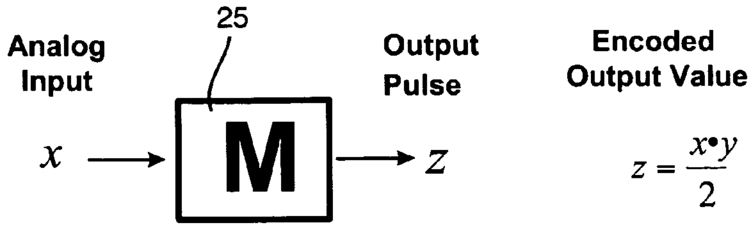
FIG. 9*a* is a simplified diagram of a symbol of the Pulse Domain Product Gate embodiment of the present invention.
Figure 9B:
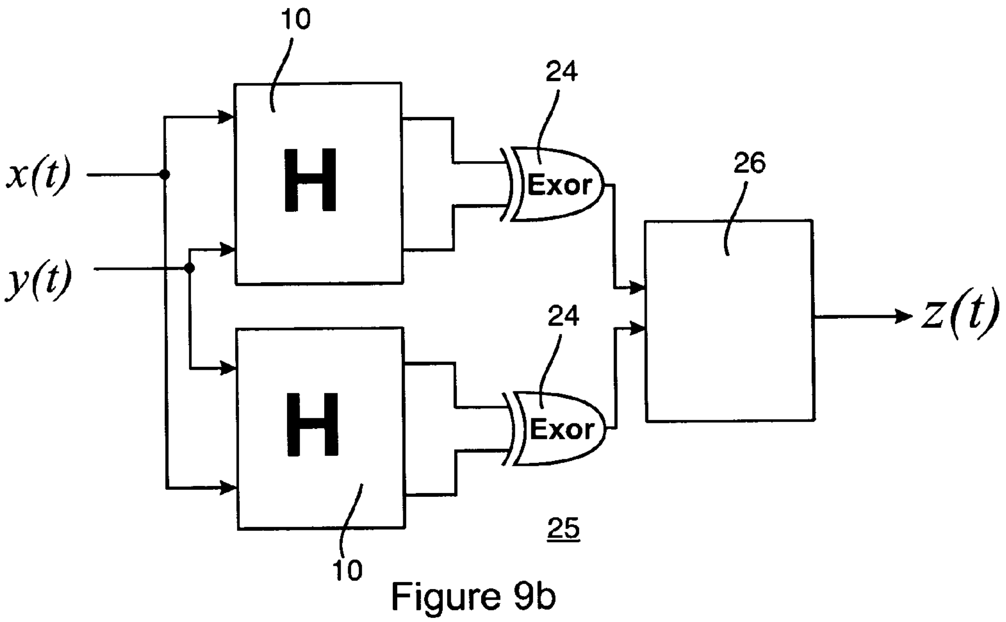
FIG. 9*b* shows the internal components of the Pulse Domain Product Gate of FIG. 9*a*, which utilizes a pair of Hadamard gates of the type shown in FIG. 2*b*.

FIGS. 9*a* and 9*b* show a diagram of the third circuit of this disclosure. It is called a Pulse Domain Product Gate 25. It can be used as a mixer, if desired.

FIG. 9*a* shows the symbol of the Pulse Domain Product Gate 25. FIG. 9*b* shows the circuit structure of the gate of the pulse domain product gate 25. It is composed of two Pulse Domain Hadamard gates 10, two asynchronous EXOR gates 24 and a two-input time encoder 26. The inputs, x(t) and y(t) are analog. The signals at the intermediate nodes (input and output of EXOR gates 24) are pulse signals, with only two possible amplitude levels. The output signal z(t) is also in the pulse domain. This gate 25 is suited to do analog signal mixing. This is an important application as it allows circuit designers to upconvert or downconvert signals at different frequencies. Such capabilities are very useful in the telecommunications industry.

Figure 1:
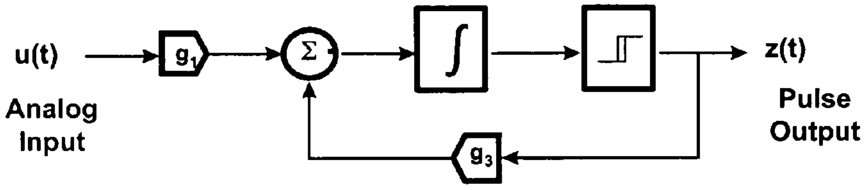
FIG. 1 is a circuit diagram of a prior art time encoder.
Figure 10:
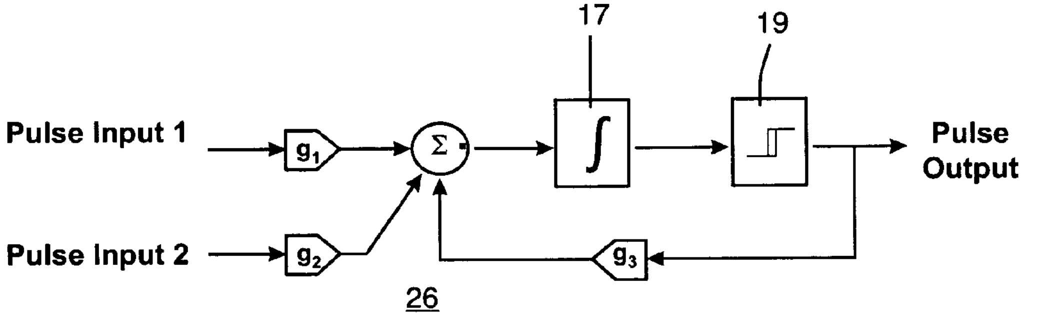
FIG. 10 depicts a two input time encoder.

The output time encoder 26 element is somewhat similar to a simple encoder of FIG. 1 but with the linear input amplifier replaced by a pair of input 1 bit DACs. FIG. 10 provides a schematic of this encoder and it is explained in greater detail below. The time encoded output signal can be reconstructed using the time decoding equations given by Lazar and Toth, noted above, for a simple time encoder. The performance of this gate is similar to the performance of the square gate described above. The solution always converges to the desired solution. This convergence is exponentially fast. Using a fast current IC technology in InP, the cycle time is lower than 100 ps. In this technology the Product/Mixing gate can do accurate mixing and time encoding of analog signals with bandwidths of close to 10 GHz.

Time Encoder with Dual Inputs

FIG. 10 is a schematic diagram of a Time Encoder with Dual Inputs 26. It is used in the Pulse Domain Product Gate described above, but it can have other applications.

The preferred embodiment includes a summing node Σ, an integrator 17, a hysteresis quantizer 19, and three 1 bit Digital-to-Analog converters (DACs) $g_1$, $g_2$ and $g_3$. The 1 bit DACs are asynchronous. They take a logical input voltage with two possible levels and produce a scaled output current with two possible levels. These 1 bit DAC elements are simple, compact and accurate when implemented in VLSI. As they operate with only input two levels and two output levels they are inherently linear. Since the DACs are asynchronous they need no clock signal.

Having described the invention in connection with a preferred implementation thereof as well as particular applications thereof to a pulse domain square gate and a pulse domain product (or multiplication) gate, modification will now suggest itself to those skilled in the art. As such the invention is not to be limited to the precise embodiments disclosed except as specifically required by the appended claims.

What is claimed is:

1. A hadamard gate comprising:

a first element, having an analog input, a pulse input and a pulse output;

a second element, having an analog input, a pulse input and a pulse output;

wherein (i) the analog input of each element forms an analog input of said hadamard gate, (ii) the pulse input of the first element is cross-connected to the pulse output of the second element, (iii) the pulse input of the second element is cross-connected to the pulse output of the first element, and (iv) each pulse output of the first and second elements form pulse outputs of said hadamard gate.

2. The hadamard gate of claim 1 wherein the first and second element each comprise:

a transconductance amplifier having an input forming the analog input of said element;

a first 1 bit digital to analog convertor having an input forming the pulse input of said element;

a summing node having an output and a plurality of inputs, one of said plurality of inputs being coupled with an output of said transconductance amplifier and a second one of said plurality of inputs being coupled with an output of said first 1 bit digital to analog convertor;

an integrator having an input coupled to the output of the summing node;

a hysteresis quantizer having an input coupled to the output of the integrator, the hysteresis quantizer also having an output forming said pulse output; and a second 1 bit digital to analog convertor having an input coupled to the output of the hysteresis quantizer, the second 1 bit digital to analog convertor having an output coupled to a third input of said summing node.

3. The hadamard gate of claim 2 wherein the first 1 bit digital to analog convertor of the first element has a first polarity, the first 1 bit digital to analog convertor of the second element has a second polarity, the first and second polarities being different from one another.

4. The hadamard gate of claim 2 wherein the second 1 bit digital to analog convertor of the first element has the same polarity as the second 1 bit digital to analog convertor of the second element.

5. The hadamard gate of claim 2 wherein the transconductance amplifier of the first element has the same polarity as the transconductance amplifier of the second element.

6. A pulse domain square gate comprising:

a hadamard gate according to claim 1, the analog inputs of the hadamard gate being connected together to form an input of said pulse domain square gate; and an exclusive OR gate having two inputs, each input of the exclusive OR gate being connected to one of the pulse outputs of the hadamard gate, an output of the exclusive OR gate forming an output of said pulse domain square gate.

7. A pulse domain product gate comprising:

first and second hadamard gates each according to claim 1, a first analog input of the first and second hadamard gates being connected together to form a first input of said pulse domain product gate, a second analog input of the first and second hadamard gates being connected together to form a second input of said pulse domain product gate;

a first exclusive OR gate having two inputs, each input of the first exclusive OR gate being connected to one of the pulse outputs of the first hadamard gate;

a second exclusive OR gate having two inputs, each input of the second exclusive OR gate being connected to one of the pulse outputs of the second hadamard gate; and a time encoder having first and second inputs, the first input of the time encoder being coupled to an output of the first exclusive OR gate, the second input of the time encoder being coupled to an output of the second exclusive OR gate, the time encoder also having an output forming an output of said pulse domain product gate.

8. A pulse domain time encoder comprising:

a first 1 bit digital to analog convertor having an input forming a first pulse domain input of said pulse domain time encoder;

a second 1 bit digital to analog convertor having an input forming a second pulse domain input of said pulse domain time encoder;

a summing node having an output and a plurality of inputs, one of said plurality of inputs being coupled with an output of said first 1 bit digital to analog convertor and a second one of said plurality of inputs being coupled with an output of said second 1 bit digital to analog convertor;

an integrator having an input coupled to the output of the summing node;

a hysteresis quantizer having an input coupled to the output of the integrator, the hysteresis quantizer also having an output forming a pulse output of said pulse domain time encoder; and a third 1 bit digital to analog convertor having an input coupled to the output of the hysteresis quantizer, the third 1 bit digital to analog convertor having an output coupled to a third input of said summing node.

9. A hadamard gate comprising:

a first and second limit cycle oscillators, each of said limit cycle oscillators including:

(i) a transconductance amplifier having an input forming an analog input of the limit cycle oscillator;

(ii) a first 1 bit digital to analog convertor having an input forming a pulse input of the limit cycle oscillator;

(iii) a summing node having an output and a plurality of inputs, one of said plurality of inputs being coupled with an output of said transconductance amplifier and a second one of said plurality of inputs being coupled with an output of said first 1 bit digital to analog convertor;

(iv) an integrator having an input coupled to the output of the summing node;

(v) a hysteresis quantizer having an input coupled to the output of the integrator, the hysteresis quantizer also having an output forming a pulse output of the limit cycle oscillator; and (vi) a second 1 bit digital to analog convertor having an input coupled to the output of the hysteresis quantizer, the second 1 bit digital to analog convertor having an output coupled to a third input of said summing node;

wherein (i) the analog input of each limit cycle oscillator forms an analog input of said hadamard gate, (ii) the pulse input of the first limit cycle oscillator is cross-connected to the pulse output of the second limit cycle oscillator, (iii) the pulse input of the second limit cycle oscillator is cross-connected to the pulse output of the first limit cycle oscillator, and (iv) each pulse output of the first and second limit cycle oscillators form pulse outputs of said hadamard gate.

10. A hadamard gate comprising:

a first and second unit elements, each unit element having two inputs, one input of the unit element being an analog input and a second input of the unit element being a pulse input;

the analog input of each unit element forms an analog input of said hadamard gate, the pulse input of the first unit element is cross-connected to the pulse output of the second unit element, the pulse input of the second unit element is cross-connected to the pulse output of the first unit element, and each pulse output of the first and second unit elements form pulse outputs of said hadamard gate.

* * * * *